United States Patent
Smestad et al.

[15] 3,668,174
[45] June 6, 1972

[54] HEAT RESISTANT COATING FOR SOLDER CONNECTIONS

[72] Inventors: Dale E. Smestad, Coltage Grove, Minn.; Nelson E. Quackenbush, Costa Mesa, Calif.

[73] Assignee: The United States of America as represented by the Secretary of the Army

[22] Filed: Jan. 27, 1971

[21] Appl. No.: 110,251

[52] U.S. Cl............................................260/37 SB
[51] Int. Cl.............................................C08g 51/04
[58] Field of Search...............................260/37 SB

[56] References Cited

UNITED STATES PATENTS

| | | |
|---|---|---|
| 3,151,099 | 9/1964 | Ceyzeriat et al.................260/37 SB X |
| 3,050,485 | 8/1962 | Nitzsche et al..................260/37 SB X |
| 3,032,528 | 5/1962 | Nitzsche et al..................260/37 SB X |
| 3,464,951 | 9/1969 | Hittmar et al......................260/37 SB |

*Primary Examiner*—Lewis T. Jacobs
*Attorney*—Harry M. Saragovitz, Edward J. Kelly, Herbert Berl and Charles R. Carter

[57] ABSTRACT

A high temperature resistant coating composition for solder connection including a mixture of room temperature vulcanizing rubber having a viscosity rating of 250 poise and selective insulators including magnesium hydroxide, magnesium carbonate, asbestos, mica, barium sulfate and calcium carbonate for shielding the connection from a heat source of a predetermined intensity for a predetermined time.

1 Claim, No Drawings

HEAT RESISTANT COATING FOR SOLDER CONNECTIONS

BACKGROUND OF THE INVENTION

This invention relates to the field of heat resistant coatings. Previous coatings consisting of RTV-60 silicone rubber with THEMOLITE 12 burst into flame in less than 16 seconds when exposed to a 2,000° F heat source at a distance of one-eighth inch and interfere with the missile guidance system.

SUMMARY OF THE INVENTION

This invention provides a coating for protecting solder connections having a flame burst factor of approximately eight times that previously known and used.

DESCRIPTION OF THE PREFERRED EMBODIMENT

Solder connections are provided with a heat resistant coating comprised of mixture of room temperature vulcanizing silicone rubber have a viscosity rating of 250 poise and selective heat insulators including magnesium hydroxide, magnesium carbonate, asbestos, mica, barium sulfate and calcium carbonate. Three grades of mica; 325 mesh water ground, hand pulverized 16 mesh vermiculite and a micronized mica have similar capabilities.

A typical coating application comprises:

|  | Parts by Weight |
| --- | --- |
| 250 Poise silicone rubber | 100 |
| Mica–325 | 20 |
| Asbestos | 1 |

We claim:

1. A high temperature resistant coating composition for solder connections exposed to temperatures in the range of 2,000° F, said composition comprising: a mixture including by weight substantially 100 parts of room temperature vulcanizing silicone rubber having a viscosity rating of 250 poise, substantially 20 parts of magnesium hydroxide and substantially one part of asbestos.

* * * * *